(12) United States Patent
Schluse

(10) Patent No.: US 12,005,767 B2
(45) Date of Patent: Jun. 11, 2024

(54) COVER FOR A VEHICLE ROOF, AND METHOD FOR PRODUCING A COVER

(71) Applicant: Webasto SE, Stockdorf (DE)

(72) Inventor: Kevin Schluse, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 162 days.

(21) Appl. No.: 17/439,637

(22) PCT Filed: Apr. 6, 2020

(86) PCT No.: PCT/EP2020/059782
§ 371 (c)(1),
(2) Date: Sep. 15, 2021

(87) PCT Pub. No.: WO2020/207975
PCT Pub. Date: Oct. 15, 2020

(65) Prior Publication Data
US 2022/0153103 A1    May 19, 2022

(30) Foreign Application Priority Data
Apr. 10, 2019 (DE) .................... 10 2019 109 470.4

(51) Int. Cl.
*B60J 7/16* (2006.01)
*B29C 44/12* (2006.01)
(Continued)

(52) U.S. Cl.
CPC ......... *B60J 7/1628* (2013.01); *B29C 44/1228* (2013.01); *B29K 2705/00* (2013.01); *B29L 2031/30* (2013.01)

(58) Field of Classification Search
CPC ... B60J 7/00; B60J 7/043; B60J 7/0435; B60J 7/047; B60J 7/05; B60J 7/053; B62D 25/00; B62D 25/06
(Continued)

(56) References Cited

U.S. PATENT DOCUMENTS

| 4,891,913 A | 1/1990 | Shimura et al. |
| 5,779,301 A | 7/1998 | Ito |

(Continued)

FOREIGN PATENT DOCUMENTS

| CN | 102348565 A | 2/2012 |
| CN | 108290483 A | 7/2018 |

(Continued)

OTHER PUBLICATIONS

Dust et al. "Attachment system and method for attaching a component to a vehicle body", Published: Feb. 3, 2017, PublisherL German Patent Office, Edition: DE102015114238A1 (Year: 2017).*

(Continued)

*Primary Examiner* — Jason S Morrow
(74) *Attorney, Agent, or Firm* — Fitch, Even, Tabin & Flannery, LLP

(57) ABSTRACT

A cover for a vehicle roof may have a panel with a surface, a functional insert which is of flexible design, and a foamed-on plastics structure. The functional insert may have two contact regions, which are spaced apart from one another and which are each in direct contact with the surface. The foamed-on plastics structure fixes the functional insert to the panel.

10 Claims, 4 Drawing Sheets

Figure 1:
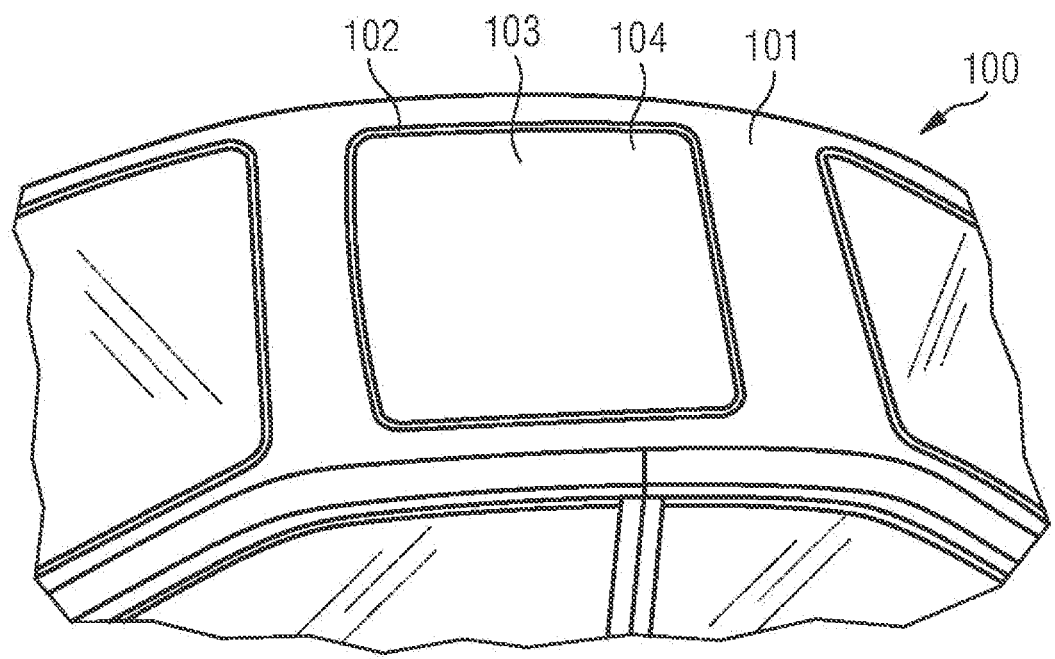
Figure 1:
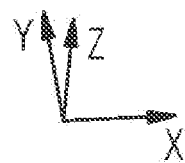

(51) Int. Cl.
  *B29K 705/00* (2006.01)
  *B29L 31/30* (2006.01)
(58) Field of Classification Search
  USPC ......... 296/136.01, 216.01–216.08, 210, 215, 296/217, 223
  See application file for complete search history.

(56) References Cited

U.S. PATENT DOCUMENTS

| | | | | |
|---|---|---|---|---|
| 6,151,834 | A * | 11/2000 | Oami | ............... B60J 7/043 |
| | | | | 296/216.06 |
| 8,636,316 | B2 * | 1/2014 | Grimm | ................ B60J 7/04 |
| | | | | 296/216.03 |
| 2002/0020935 | A1 | 2/2002 | Bergmiller et al. | |
| 2003/0085595 | A1 | 5/2003 | Dunzinger et al. | |
| 2003/0137166 | A1 * | 7/2003 | Tamura | ............... B60J 10/30 |
| | | | | 296/216.09 |
| 2004/0160090 | A1 * | 8/2004 | Teschner | ........ B32B 17/10247 |
| | | | | 296/211 |
| 2007/0246973 | A1 | 10/2007 | Huebner et al. | |
| 2012/0025568 | A1 | 2/2012 | Faerber | |
| 2016/0185195 | A1 | 6/2016 | Akuzawa et al. | |
| 2016/0229273 | A1 | 8/2016 | Maeda et al. | |
| 2018/0236854 | A1 | 8/2018 | Hortrich et al. | |
| 2018/0326831 | A1 | 11/2018 | Bott | |
| 2019/0047388 | A1 | 2/2019 | Hammer | |
| 2020/0122637 | A1 | 4/2020 | Thannheimer | |

FOREIGN PATENT DOCUMENTS

| | | |
|---|---|---|
| CN | 108698494 A | 10/2018 |
| DE | 3742719 A1 | 7/1989 |
| DE | 19918150 C1 | 10/2000 |
| DE | 10036630 C1 | 1/2002 |
| DE | 10253428 A1 | 7/2003 |
| DE | 102014114414 A1 | 4/2016 |
| DE | 102015114238 A1 * | 3/2017 ............. B60J 10/90 |
| DE | 102016001629 A1 | 8/2017 |
| DE | 102018111783 A1 | 11/2019 |
| EP | 1302352 A1 | 4/2003 |
| EP | 1750960 A1 | 2/2007 |
| EP | 2254766 A1 | 12/2010 |
| EP | 3063027 A1 | 9/2016 |
| FR | 3018742 A1 | 9/2015 |
| JP | 6024671 A1 * | 2/1986 ............. B62D 25/10 |
| JP | 2566145 Y2 * | 3/1998 ............... B60J 5/00 |
| WO | 2018/219657 A1 | 12/2018 |

OTHER PUBLICATIONS

Masahiro, "Panel Reinforcing Structure", Published: Feb. 3, 1986, Publisher: Japanese Patent Office, Edition: JP6024671A1 (Year: 1986).*
Nakajo, "Stiffener Bonding Structure", Published: Mar. 25, 1998, Publisher: Japanese Patent Office, Edition: JP2566145Y2 (Year: 1998).*
International Search Report for PCT/EP2020/059782 mailed Jun. 22, 2020, in English and German (5 pages).
German Examination Report (6 pages)(in German).
Chinese Office Action from related Chinese Application No. 202080027283.2; dated Aug. 28, 2023 with English Translation (16 Pages).

* cited by examiner

COVER FOR A VEHICLE ROOF, AND METHOD FOR PRODUCING A COVER

CROSS-REFERENCE TO RELATED APPLICATION

This application is a U.S. national phase application filed under 35 U.S.C. § 371 of International Application No. PCT/EP2020/059782, filed Apr. 6, 2020, designating the United States, which claims priority from German Patent Application Number DE10 2019 109 470.4, filed Apr. 10, 2019, which is hereby incorporated herein by reference in its entirety for all purposes.

FIELD

The invention relates to a cover for a vehicle roof and to a method for producing a cover for a vehicle roof, wherein the cover comprises in particular a foamed-on plastics structure.

BACKGROUND

A cover for a vehicle roof, for example a movable cover of a sliding roof or a fixed element, comprises fastening elements and possibly reinforcing elements. These must be fastened to the main cover element.

It is desirable to specify a cover for a vehicle roof that can be produced in a simple and reliable manner. It is also desirable to specify a method for producing a cover for a vehicle roof that is simple and reliable.

SUMMARY

One aspect of the invention relates to a cover for a vehicle roof. The cover comprises a panel. The panel is for example a glass pane or a plastics sheet. The panel has a surface. The cover comprises a functional insert. The functional insert is for example a reinforcing element and/or a fastening element or another element that is useful to the function of the cover, for example a retaining bracket or a frame. The cover comprises a foamed-on plastics structure. The foamed-on plastics structure may also be configured in the form of a foamed portion and/or foamed edge portion, in which foam is applied around the edge of the panel. Alternatively or additionally, the foamed-on structure is part of a foamed portion and/or foamed edge portion. The foamed-on plastics structure is formed in particular from a polyurethane. It is also possible to use another plastic. The foamed-on plastics structure may also be a molded-on plastics structure.

The functional insert comprises two contact regions which are spaced apart from one another. The contact regions are each in direct contact with the surface. The functional insert is of flexible design. The foamed-on plastics structure fixes the functional insert to the panel. By means of the contact with the panel and the foamed-on plastics structure, the functional insert of flexible design is reinforced such that overall a stable arrangement is formed. The functional insert is of flexible configuration in particular in the original state, before it is fixed to the panel. Without the foamed-on structure, the functional insert is flexible. The two contact regions which are spaced apart from one another make it possible to arrange and position the functional insert on the surface in an exact manner. Tilting or similar, which could occur with a single contact region, is thus avoided.

The functional insert is fixedly connected to the panel by means of the foamed-on plastics structure. It is also possible to fasten a plurality of functional inserts to the panel by means of the foamed-on structure. In this case, the functional inserts may be constructed differently to one another or be similar. The functional insert is used, for example, for the attachment of various assemblies such as guide rails or the bodyshell of the vehicle or a deployment mechanism or a cover carrier. The flexible design of the functional insert with the two contact regions which are spaced apart from one another has the effect of avoiding the risk of tilting occurring during the forming of the foamed-on plastics structure. Predefined tolerances for the arrangement of the functional insert relative to the panel can also be implemented in a precise manner. Tilting would have a pronounced influence on the function of the functional insert and in particular of screwed-on components. It could even lead to the functional insert no longer being able to be contacted at its predefined position. It would thus result in a malfunction.

The functional insert which is initially of soft and flexible design reduces the tolerance influence of the sheet-like material. The two contact surfaces, which can also be referred to as sealing surfaces with respect to the panel, reduce the risk of tilting or avoid it. The connection to the panel by means of the foamed-on plastics structure facilitates a functional insert which is stable during operation in spite of the flexibly designed functional insert. A sufficient stability of the functional insert is produced by means of the foamed-on structure. The flexibility is predefined for example in dependence on environmental conditions, for example a closing force of the foaming tool or other environmental conditions.

According to at least one embodiment, the functional insert comprises a middle region between the two contact regions. The middle region is spaced apart from the surface. An assembly interface, for example, is arranged on the middle region. The assembly interface comprises for example a thread, such that external elements can be fastened to the functional insert by means of a screw connection.

According to at least one embodiment, the functional insert comprises two side regions. Each side region is arranged between the middle region and one of the contact regions. The side regions are each configured such that the contact regions are movable in each case relative to the middle region. Tolerance compensation is thus implemented during the production. The side regions can compensate for any inaccuracies in the positioning in the foaming tool. A sufficient tolerance with respect to fluctuating process parameters is thus implemented in spite of the two contact regions.

According to at least one embodiment, the functional insert comprises a coupling region. The coupling region adjoins one of the contact regions. The coupling region is spaced apart from the surface. The foamed-on plastics structure is arranged partially between the surface and the coupling region. A part of the foamed-on plastics structure is arranged between the surface and the coupling region. In this region, the foamed-on plastics structure is in direct contact with the surface and surrounds the coupling region at least on two sides. The foamed-on plastics structure is thus attached both to the panel and to the functional insert. The functional insert is thus connected to the panel for example on both sides at two mutually spaced-apart coupling regions by means of the foamed-on plastics structure.

According to at least one embodiment, the contact regions each comprise a cutout. The cutout is configured for example in the form of a slot or similar. The cutout allows for reliable sealing in the tool for forming the foamed-on plastics structure.

According to at least one embodiment, the functional insert is formed from a sheet-like material, in particular from a metal sheet, for example from a steel sheet. Sufficient stability is thus ensured. The required flexibility can thus also be implemented.

According to at least one embodiment, the panel and the functional insert, in cross section, completely surround an interior space. In particular, in cross section, transverse to the main extent of the panel, the interior space is delimited on one side by the panel and on three further sides by the functional insert. A stable system is thus implemented.

According to at least one embodiment, the functional insert is free of stiffening portions. In particular, no stiffening portions such as embossings or beads are formed on the middle region and the side regions. The desired flexibility is thus made possible.

One aspect of the invention relates to a method for producing a cover for a vehicle roof. In particular, a cover according to the embodiments and examples described here is produced.

The features and advantages stated in conjunction with the cover also find use in connection with the production method and vice versa.

The method comprises providing a panel with a surface. A functional insert is provided. The functional insert comprises two contact regions which are spaced apart from one another. The contact regions are placed directly onto the surface. A foamed-on plastics structure for fixing of the functional insert is formed on the panel.

The functional insert which is initially of flexible design is pressed against the panel by a foaming tool. The functional insert is fixed to the panel by means of the foamed-on plastics structure. The production operation is thus less susceptible to fluctuating process parameters and nevertheless provides a sufficiently stable system composed of panel, functional insert and foamed-on plastics structure.

Further advantages, features and developments emerge from the examples elucidated below in conjunction with the figures. In this case, elements that are identical, similar or have the same effect can be provided with the same reference designations throughout the figures.

In the figures:

BRIEF DESCRIPTIONS OF THE DRAWINGS

Figure 2:
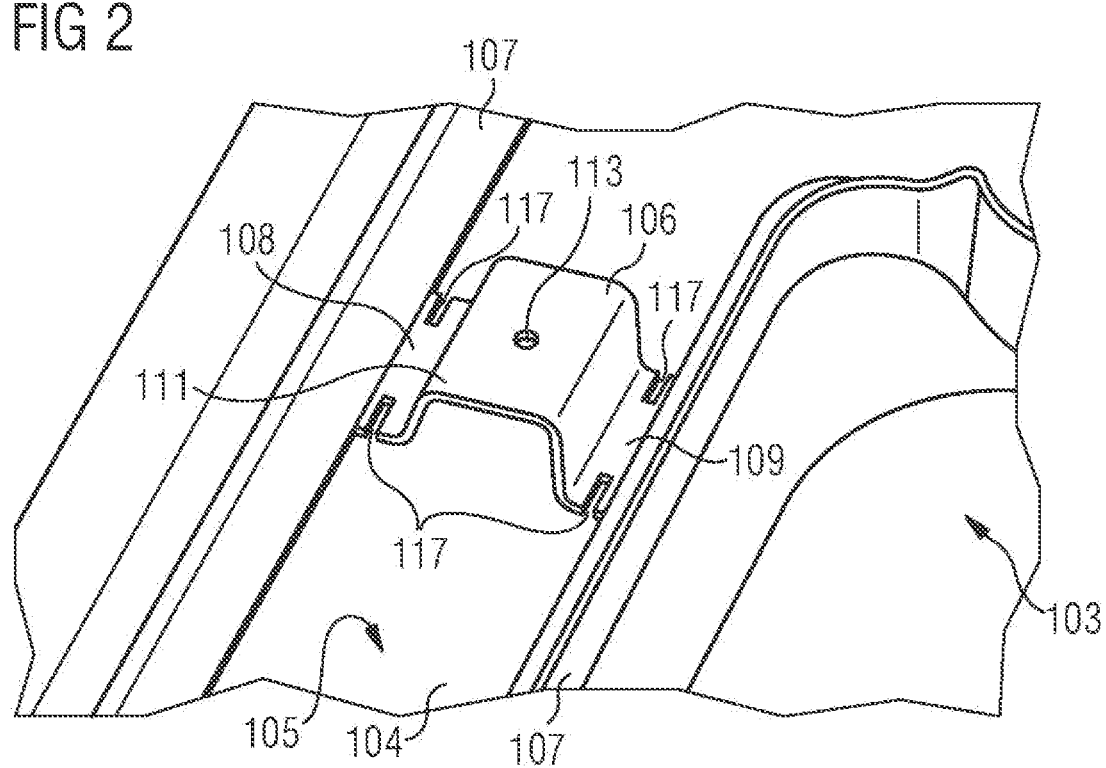
Figure 3:
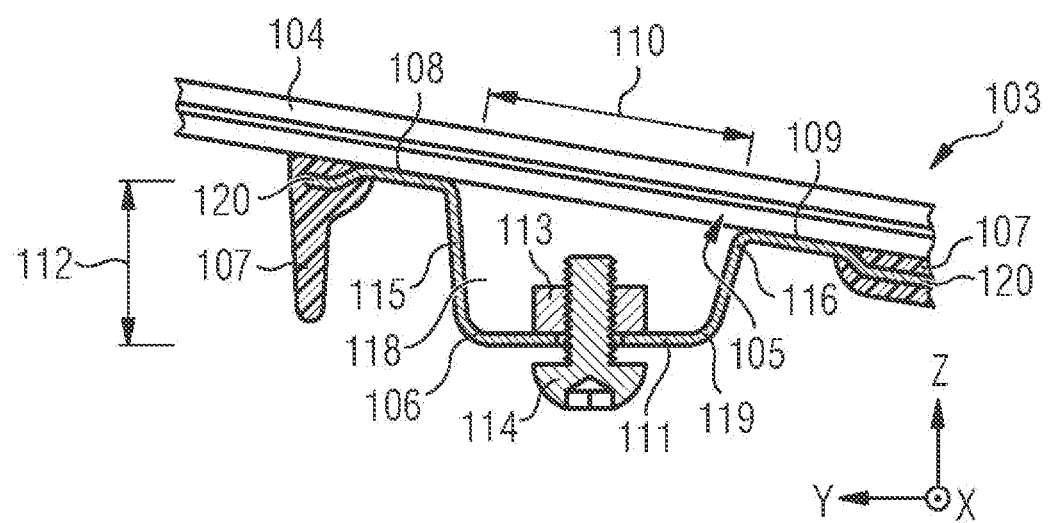
Figure 4:
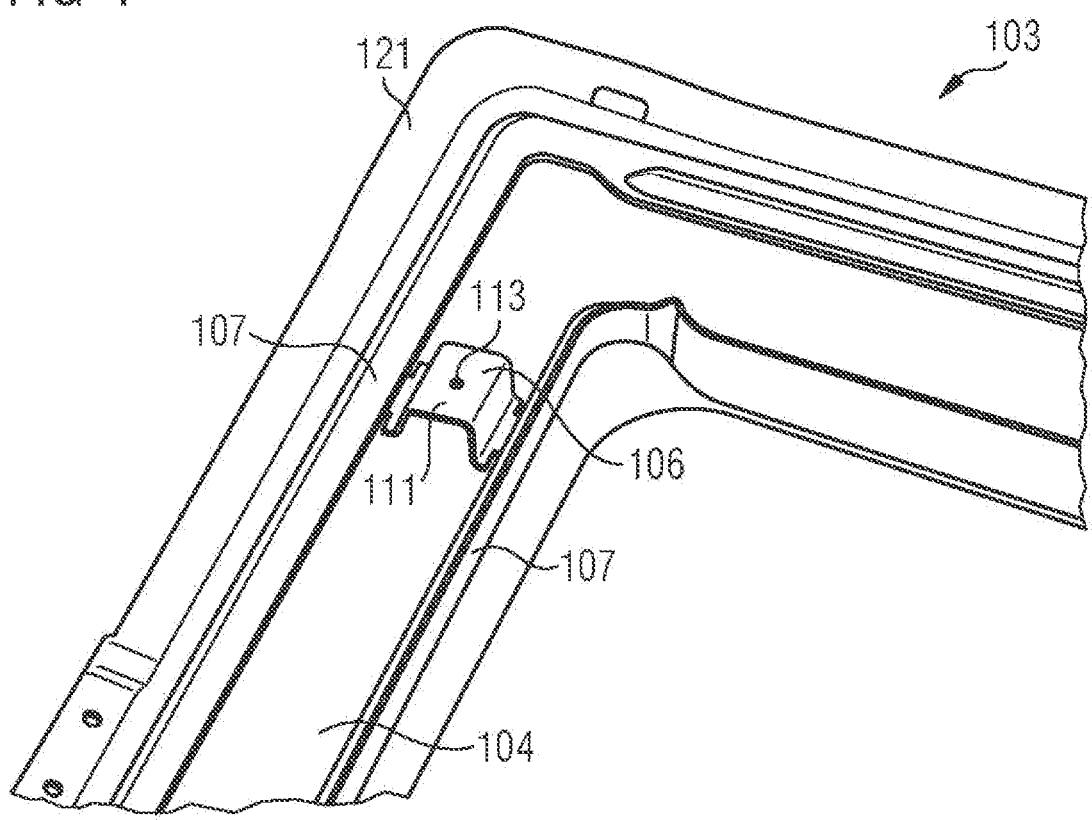
Figure 5:
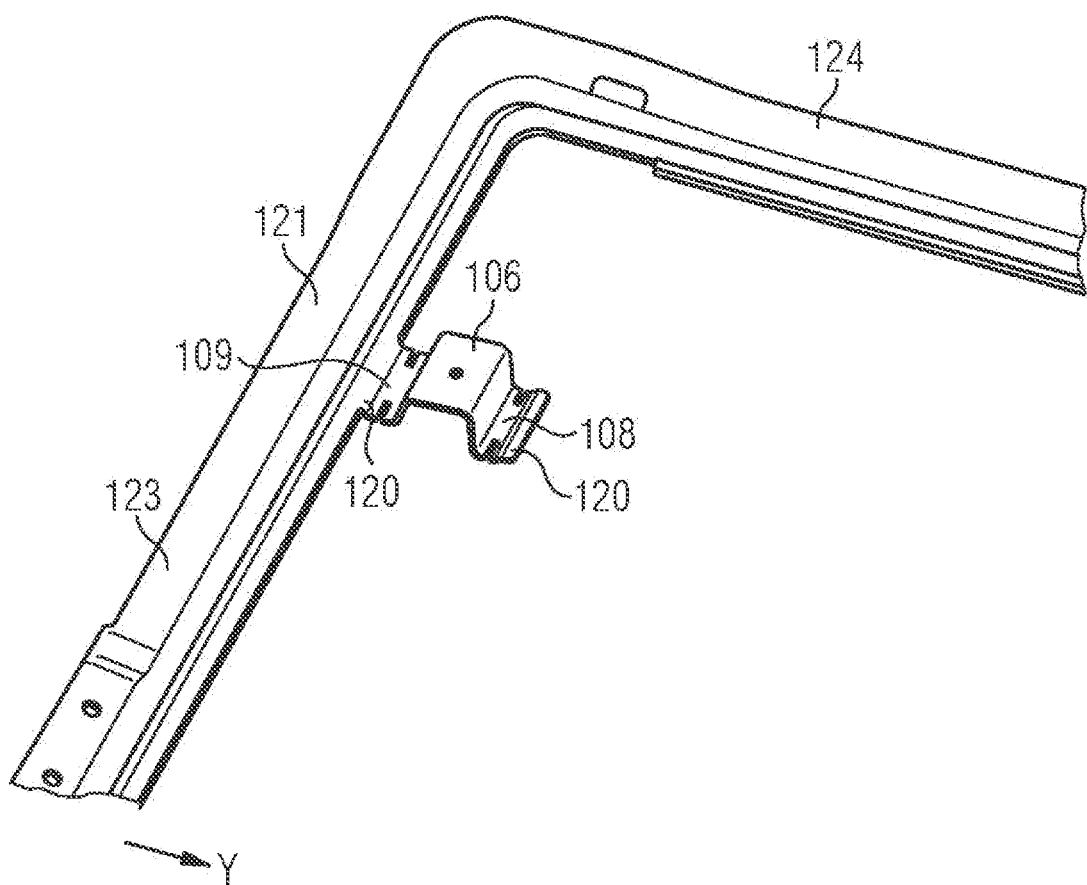
Figure 6:
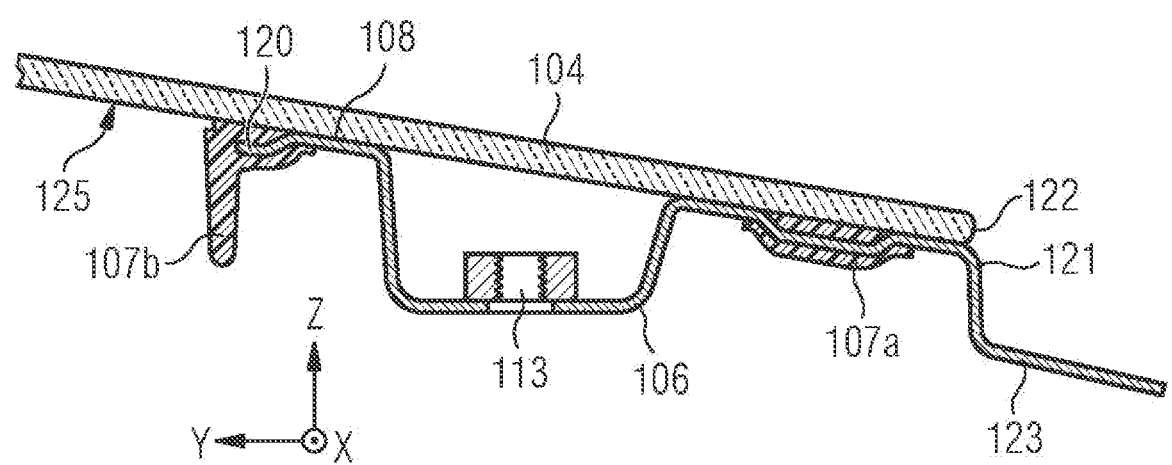

FIG. 1 shows a schematic illustration of a part of a vehicle according to one exemplary embodiment, FIG. 2 shows a schematic illustration of a part of a cover according to one exemplary embodiment, FIG. 3 shows a schematic sectional view of a part of a cover according to one exemplary embodiment, FIG. 4 shows a schematic illustration of a part of a cover according to one exemplary embodiment, FIG. 5 shows a schematic illustration of a part of a frame according to one exemplary embodiment, and FIG. 6 shows a schematic sectional view of a part of a cover according to one exemplary embodiment.

DETAILED DESCRIPTION

FIG. 1 shows a detail of a vehicle 100. The vehicle 100 has a vehicle roof 101. A cover 103 is arranged on the vehicle roof 101. According to exemplary embodiments, the cover 103 is arranged such that it cannot move relative to the rest of the vehicle roof 101. The cover 103 is for example part of a so-called panoramic roof. According to further exemplary embodiments, the cover 103 is movable relative to the rest of the vehicle roof. It is thus possible for a roof opening 102 to be selectively closed by the cover 103 or to be partially opened.

The cover 103 comprises a panel 104. The panel 104 is for example a glass pane or a plastics sheet such as a polycarbonate sheet.

FIG. 2 shows the cover 103 according to one exemplary embodiment. The cover 103 comprises the panel 104. The panel 104 has a surface 105. The surface 105 faces toward an interior of the vehicle 100 in the state ready for operation. The surface 105 is in particular one of the surfaces where the extent of the panel 104 is greatest.

A foamed-on plastics structure 107 is attached to the panel 104. The foamed-on plastics structure 107 is in particular a foamed-on PU structure, which may also be part of a foamed portion and/or foamed edge portion. Alternatively or additionally, it is possible for the foamed-on structure to be configured in the form of a foamed portion and/or foamed edge portion.

The cover 103 comprises a functional insert 106. In the exemplary embodiment illustrated, the functional insert 106 is configured in the form of an assembly interface 113.

It is for example possible for a screw 114 to be connected to the assembly interface 113. Further elements such as deployment mechanisms, the vehicle body of the vehicle 100 or further elements such as guide rails can thus be coupled to the cover 109 by means of the functional insert 103.

The functional insert 106 can alternatively or additionally also have other functions, such as for example an encircling frame plate, a lateral stiffening portion or other functions and refinements are possible.

As can also be seen from FIG. 3, which shows a cross section in the ZY plane, the functional insert 106 comprises two contact regions 108, 109. The functional insert 106 is in direct contact with the surface 105 of the panel 104 at the contact regions 108, 109. The functional insert 106 is supported on the panel 104 at the two contact regions 108, 109. During production, the functional insert 106 is pressed against the surface 105 at the two contact regions 108, 109.

The two contact regions 108, 109 have a distance 110 from one another. The two contact regions 108, 109 are designed to be separate from one another. The contact regions 108, 109 are spaced apart from one another to such an extent that they can reliably prevent tilting of the functional insert 106 relative to the panel 104.

The functional insert 106 comprises a middle region 111 between the two contact regions 108, 109. The middle region is arranged along the Z direction at a distance 112 from the surface. Between the two contact regions 108, 109, the functional insert 106 is thus not in direct contact with the surface 105.

The middle region 111 is connected to the contact region 108 by means of a second region 115 of the functional insert 106. The middle region 111 is connected to the contact region 109 by means of a further side region 116.

On those sides of the contact regions 108, 109 which face away from the middle region 111, the functional insert 106 comprises a respective coupling region 120. The coupling region 120 is arranged spaced apart from the surface and not in direct contact with the surface 105.

In cross section, the functional insert 106 thus comprises, along the Y direction, first the coupling region 120, then the contact region 109, then the side region 116, then the middle region 111, then the side region 115, then the contact region 108 and then the coupling region 120. A respective transition region 119 is arranged between the middle region 111 and the two side regions 115, 116. This transition region, at which the side regions 115, 116 and the middle region 111 enclose for example an angle of between 30° and 90°, is designed in particular so as to be free of reinforcements or stiffening portions such as embossings or beads. This has the effect, inter alia, that the functional insert 106, in particular in the non-installed state, is of flexible and soft design. The functional insert 106 is formed from a sheet-like material, in particular a metal sheet. Other materials may also be built in, such as plastics. The selection of the material, and also the geometry of the functional insert and the omission of reinforcements, leads to a sufficient flexibility of the functional insert 106, in particular in the non-installed state.

This flexible functional insert can be positioned within predefined tolerances during production even in the case of changing process parameters, without damaging the panel 104 in the process.

Two cutouts 117 are formed in each case on the contact regions 108, 109. It is also possible for more or fewer cutouts 117 to be formed. The cutouts are slot-shaped in the exemplary embodiment shown. Reliable sealing during the formation of the foamed-on structure 107 can be implemented by means of the cutouts 117.

The foamed-on plastics structure 107, which comprises for example foamed-on polyurethane, serves to fasten the functional insert 106 to the cover 103. According to further embodiments, the foamed-on plastics structure 107 additionally has further functions, for example a sight guard or similar.

The foamed-on plastics structure 107 connects to the surface 105 of the panel 103 in a materially bonded manner. The foamed-on plastics structure 107 surrounds the functional insert 106 completely at least at the coupling regions 120. The foamed-on plastics structure 107 connects to the functional insert 106 in a materially bonded manner in the coupling regions 120. A connection between the panel 104 and the functional insert 106 is thus formed by means of the foamed-on plastics structure 107.

In the exemplary embodiment illustrated, the foamed-on plastics structure 107 comprises two separate regions, which are spaced apart from one another in particular in the Y direction.

The contact regions 108, 109 and the middle region 111 of the functional insert 106 are arranged between the two regions of the foamed-on plastics structure 107. The foamed-on plastics structure 107 is attached on those sides of the contact regions 108, 109 of the functional insert 106 which face away from the middle region 111. The foamed-on plastics structure 107 is arranged on the coupling region 120 between the surface 105 and the functional insert 106. Stable attachment is thus implemented. Along the Y direction, the foamed-on plastics structure 107 does not penetrate into the contact region 108, 109 in which the direct contact between the functional insert 106 and the surface 105 is formed. In this way, the panel 104 and the contact regions 108, 109 are in contact.

As can be seen from the cross section of FIG. 3, the panel 104 and the functional insert 106 surround an interior space 118 completely. Possible exceptions are openings in the assembly interface 113 or similar. However, the interior space 118 is delimited on at least three sides by the functional insert 106 and on one side by the panel 104. The contact regions 108, 109 are formed on both sides of the interior space 118. A stable overall system is thus created in which, in particular, the functional insert 106 is secured against tilting relative to the panel 104.

FIG. 4 shows the cover 103 in a further illustration comparable to FIG. 2. A frame 121 is additionally illustrated, which is not shown in FIG. 2. However, the frame 121 is present in all exemplary embodiments, even if it is not explicitly illustrated in the figures.

FIG. 5 shows the frame 121 again without the foamed-on plastics structure 107.

The frame 121 is for example configured such that, in the assembled state, the frame 121 completely encircles and surrounds the panel 104. Alternatively, the frame 121 encircles the panel 104 for example along three sides of the panel 104. The frame 121 is configured for example in the form of a fully encircling frame or only in the form of a partial frame.

A side part 123 of the frame 121 is assigned to an outer side 122 of the panel 104 (FIG. 6). Comparably thereto, a longitudinal part 124 of the frame 121 is assigned to a further outer side (not explicitly illustrated) of the panel 104, said further outer side running in particular substantially transversely with respect to the outer side 122. The outer side 122 extends substantially along the Z direction in the state ready for operation. The outer side 122 has a smaller extent than the rest of the sides of the panel 104.

The frame 121 extends with a further side part, which corresponds in particular to the side part 123, on an outer side of the panel 104 lying opposite along the Y direction.

As is for example also apparent from FIG. 6, in cross section, in the Y direction, the side part 123 of the frame 121 is thus provided first, then at least partially the functional insert 106, then a transparent surface 125 of the panel 104, then, on the opposite outer side, for example first a further functional insert 106 and then again a side part of the frame 121. The functional insert 106 is arranged between two opposite side parts 123.

The functional insert 106 is configured in the form of a protruding element of the frame 121. For example, the functional insert 106 protrudes along the Y direction beyond the normal extent of the side part 123 outside the functional insert 106. The functional insert 106 is in particular an integral part of the frame 121 and directly adjoins the side part 123. The frame 121, in particular the side part 123, and the functional insert 106 are of one-piece configuration.

The frame 121 is in particular a so-called stiffening frame or assembly frame and can also be referred to as a cover inner panel. The frame 121 and the functional insert 106 are formed in particular from the same material, for example from a metal. It is also possible for the functional insert 106 to initially be present as a separate component and to subsequently be fastened for example to the side part 123.

The functional insert 106 with the assembly interface 113 is formed in particular not along the entire length of the frame 121 but only in certain portions. For example, the functional inserts are formed only at a few points, for example at up to ten points of the frame 121. The frame 121 thus has different cross sections along its profile, the functional inserts 106 protruding to a significant extent beyond the rest of the cross section of the frame 121 in the region of the functional inserts 106.

The foamed-on plastics structure 107 comprises the two spaced-apart separate regions in the region of the individual frame portions, that is to say for example along the side part 123 and along the longitudinal part 124. For better understanding, the first region of the foamed-on plastics structure 107 is denoted by the reference designation 107a in FIG. 6. The further region or else second region is denoted by the reference designation 107b.

Along the Y direction, for example four separate regions of the foamed-on plastics structure 104 are thus in turn provided in cross section, two that are assigned to the first side part 123 and two that are assigned to the side part lying opposite in the Y direction. The first region 107a of the foamed-on plastics structure 107 runs along the outer side 122 of the panel 104 along the frame 121. The second region 107b of the foamed-on plastics structure 107 runs at a spacing from the side part 123 and the longitudinal part 124 on a side of the functional insert 106 that faces the transparent surface 125.

The functional insert 106 is therefore arranged between the two regions 107a, 107b of the foamed-on plastics structure 107, there being, along the Y direction, the successive arrangement of first the transparent surface 125 and then in turn a further second region of the foamed-on plastics structure 107 and then a further first region of the foamed-on plastics structure 107. The two regions 107a, 107b of the foamed-on plastics structure 107 run, for example with respect to their respective main extension, in the same direction along the outer side 122 of the panel 104. Two regions 107a, 107b of the foamed-on plastics structure 107 are assigned to each outer side 122 of the panel 104. That region 107b of the foamed-on plastics structure 107 which faces the transparent surface 125 is thus in turn arranged between two regions of the foamed-on plastics structure 107 along the Y direction.

In cross section, the frame 121 is for example first fastened to the panel 104 by way of the first region 107a of the foamed-on plastics structure 107. The functional insert 106 is subsequently formed, the functional insert 106 being formed in particular as an integral, protruding region of the frame 121. The further region 107b of the foamed-on plastics structure 107, said further region for example also serving as a sight guard, is formed on the contact region 108 facing away from the outer side 122 or on the assigned coupling region 120. The further region 107b of the foamed-on plastics structure 107 is arranged for example between the transparent surface 125 and the functional insert 106 or between the transparent surface 125 and the outer side 122 of the panel 104. The further region 107b of the foamed-on plastics structure 107 is arranged between the transparent surface 125 and the first region 107a of the foamed-on plastics structure 107.

The cover 103 thus comprises, on the one hand, the frame 121, which for example assumes the function of a cover inner panel. In addition, a functional insert 106 is provided or a plurality of functional inserts 106 are provided, which are formed within the rest of the frame 121. These functional inserts 106 are each configured to be flexible enough to be able to compensate for tolerances during production by means of deformation. This in particular makes reliable attachment of the inner region 107b of the foamed-on plastics structure 107 possible.

The flexibility of the functional insert 106 has the effect that the functional insert can be pressed sufficiently securely against the surface 105 at the coupling regions 108, 109 during production. This leads to sufficiently good sealing so that the foamed-on plastics structure 107 does not penetrate into the contact regions 108, 109, and in particular does not penetrate into the interior space 118, during production.

The connection of the functional insert 106 on both sides both at the coupling region 120 next to the contact region 108 and at the further coupling region 120 next to the contact region 109 leads to a sufficiently stable assembly. In particular, after hardening, the foamed-on plastics structure 107 has a Shore hardness of 90 to 95, for example. This also leads to stiffening of the originally flexible sheet-like material of the functional insert 106. The cover 103 can thus be produced in an inexpensive and reliable manner. The production operation is less susceptible to fluctuating process parameters and thus provides a more stable system overall. Malfunctions due to excessive tolerance deviations can be avoided.

REFERENCE DESIGNATIONS

100 Vehicle
101 Vehicle roof
102 Roof opening
103 Cover
104 Panel
105 Surface
106 Functional insert
107, 107a, 107b Foamed-on plastics structure
108, 109 Contact region
110 Distance
111 Middle region
112 Distance
113 Assembly interface
114 Screw
115, 116 Side region
117 Cutout
118 Interior space
119 Transition region
120 Coupling region
121 Frame
122 Outer side
123 Side part
124 Longitudinal part
125 Transparent surface
126 Inner side
X, Y, Z Direction

The invention claimed is:

1. A cover for a vehicle roof, comprising:
a panel with a surface,
a functional insert which is of flexible design,
a foamed-on plastics structure,
wherein the functional insert comprises two contact regions which are spaced apart from one another and which are each in direct contact with the surface,
the foamed-on plastics structure fixes the functional insert to the panel,
wherein the functional insert comprises a middle region between the two contact regions, the middle region being spaced apart from the surface, and
wherein the foamed-on plastics structure comprises two spaced-apart separate regions, each spaced-apart separate region assigned to one of the contact regions and each spaced-apart separate region arranged on the sides of the contact regions which face away from the middle region.

2. The cover according to claim 1, wherein an assembly interface is arranged on the middle region.

3. The cover according to 1, wherein the functional insert comprises two side regions, each of which is arranged between the middle region and one of the contact regions, wherein the side regions are each configured such that the contact regions are movable in each case relative to the middle region.

4. The cover according to claim 1, wherein the functional insert comprises a coupling region which adjoins one of the contact regions, wherein the coupling region is spaced apart from the surface and the foamed-on plastics structure is arranged partially between the surface and the coupling region.

5. The cover according to claim 1, wherein the contact regions each comprise a cutout.

6. The cover according to claim 1, wherein the functional insert is formed from a metal sheet.

7. The cover according to claim 1, wherein the panel and the functional insert, in cross section, completely surround an interior space.

8. The cover according to claim 1, wherein the functional insert is free of stiffening portions.

9. A method for producing a cover for a vehicle roof 1, comprising: providing a panel with a surface, providing a functional insert which is of flexible design and which comprises two contact regions which are spaced apart from one another, placing the contact regions directly onto the surface, and forming a foamed-on plastics structure for fixing the functional insert to the panel.

10. The cover according to claim 1, wherein the foamed on plastics structure is configured such that an underside of the middle region is accessible and graspable from above.

* * * * *